US00RE35404E

United States Patent [19]

Brown

[11] E Patent Number: Re. 35,404

[45] Reissued Date of Patent: Dec. 17, 1996

[54] IGNITION-SOURCE FREE FUEL PUMP

[75] Inventor: Albert W. Brown, Newport Beach, Calif.

[73] Assignee: J. C. Carter Company, Inc., Costa Mesa, Calif.

[21] Appl. No.: 452,117

[22] Filed: May 26, 1995

Related U.S. Patent Documents

Reissue of:

[64] Patent No.: 5,215,430
Issued: Jun. 1, 1993
Appl. No.: 841,503
Filed: Feb. 26, 1992

[51] Int. Cl.[6] ..... F04D 29/58

[52] U.S. Cl. ..... 415/110; 415/175; 415/182.1; 417/367; 417/423.8

[58] Field of Search ..... 415/110, 112, 415/111, 170.1, 182.1; 417/367, 423.8

[56] References Cited

U.S. PATENT DOCUMENTS

| | | | |
|---|---|---|---|
| 1,704,362 | 3/1929 | Johnson | 415/111 |
| 2,349,131 | 5/1944 | Anderson | 415/112 |
| 2,390,332 | 12/1945 | Schmidt | 415/175 |
| 3,178,153 | 4/1965 | Jacomet | 415/182.1 |
| 3,652,186 | 3/1972 | Carter | 415/110 |
| 3,653,785 | 4/1972 | Dahlgren et al. | 417/423.8 |
| 3,659,674 | 5/1972 | Ferrario | 184/6.16 |
| 3,947,154 | 3/1976 | Klepp et al. | 417/423.8 |
| 4,682,936 | 7/1987 | Suzuki et al. | 417/366 |
| 4,775,293 | 10/1988 | Boster | 415/112 |
| 5,015,156 | 5/1991 | Scholz | 417/370 |
| 5,051,071 | 9/1991 | Haentjens | 417/423.8 |

*Primary Examiner*—Edward K. Look
*Assistant Examiner*—Michael S. Lee
*Attorney, Agent, or Firm*—Kelly Bauersfeld & Lowry

[57] ABSTRACT

Apparatus and method for making an immersed fuel transfer pump free of possible sources of ignition for fuel-vapor mixtures when the pump is run dry. The bearings and face seals are cooled by hydraulic oil used to power the pump, preferably through connecting the case leakage port on a conventional multiple piston type hydraulic motor to the pump as a supply and ducting the leakage through the bearings and near the seals on its way to the reservoir. An auxiliary pump built into the centrifugal pump shaft increases flow over these critical parts via a closed loop. Leakage past the dynamic face seals is led overboard through a flame-quenching passage.

26 Claims, 2 Drawing Sheets

IGNITION-SOURCE FREE FUEL PUMP

Matter enclosed in heavy brackets [ ] appears in the original patent but forms no part of this reissue specification; matter printed in italics indicates the additions made by reissue.

BACKGROUND OF THE INVENTION

1. Field of the Invention

This invention is in the field of fuel transfer pumps as used, for example, in inflight refueling of aircraft.

2. Background of the Invention

Relatively high flow fuel transfer pumps are needed in several applications throughout industry. The invention described herein is primarily designed to overcome one particular problem in one particular application, pumps used to transfer fuel between aircraft in flight. The discussion will be limited to the problem of how to avoid ignition of fuel vapors by the pumping machinery, even though other advantages of the invention such as long unattended service life may prove useful in other fields or for other applications.

Combustible vapors or mixtures of fuel vapor and air occur in the ullage space of jet aircraft fuel tanks at ambient temperatures (as well as elsewhere). The pump used to empty the tank or other vessel is inevitably and customarily immersed in the liquid, but when the fuel is almost drained or completely drained, the pump and its motor are in direct contact with gases which can be ignited. The ensuing heat release or explosion is extremely hazardous so the prior art contains a number of inventions and practices to avoid ignition. My invention carries the art a step beyond the existing art by ensuring the absence of hot metal or carbon in the pump component itself.

Common practice is to drive a centrifugal pump with a hydraulic motor driven by about 3000 pounds per square inch (psi) hydraulic fluid and exhausting into a reservoir at about 100 psi. A multiple-piston type hydraulic motor which can be fully sealed is used. To prevent hydraulic oil which leaks slowly past the pistons from pressurizing the case, a direct drain port is provided to return "case leakage" to the reservoir. This case drain is in parallel to the reservoir-return line from the working pistons, and flows a few cubic inches of hydraulic oil per minute. Thus, the drive motor for the centrifugal pump presents no ignition hazard for the pumped fuel vapor. It is inherently safe because the motor will not operate without case leakage—the pistons see no pressure differential.

Present-day practice is to use precision graphite sleeve bearings and thrust bearings to guide the impeller shaft to hold the impeller itself (which runs with small clearance to the pump housing in places) spinning on the proper axis. In the event the impeller spin axis drifts sideways toward the housing "wear rings" are provided for the closely fit parts which, for pump efficiency, must limit recirculation leakage of the fuel at higher-than-inlet pressure back to inlet pressure. Pump efficiency dictates close tolerances on the impeller-to-housing gaps; pump life dictates the reverse.

When the prior-art pumps are run dry, lubrication of the graphite sleeve bearings (which are usually lubricated by fuel) ceases to exist and the graphite wears rapidly. Not only does this reduce pump life by requiring the wear rings to guide the spinning impeller, it heats the impeller, wear rings, the now-unlubricated bearings, and housing—occasionally to about 400° F. which is high enough to ignite the fuel vapor-air mixture, allowing flame to propagate throughout the vessel. More than one fatal aircraft crash has been attributed to exactly the occurrence described above. The age of the pumps prior to these occurrences is not known to me, but even a new graphite sleeve bearing can wear or disintegrate and generate heat rapidly when run dry.

SUMMARY OF THE INVENTION

The pump I have invented not only overcomes the problem of impeller tracking due to bearing slop, but all potential ignition sources whether caused by frictional heating or leakage past dynamic seals.

My invention uses angular contact anti-friction bearings, spring loaded toward each other and copiously lubricated and cooled using an auxiliary pump built into the impeller. This locates the impeller firmly and permanently free of any housing wear rings the pump might have (not all centrifugal pumps have them). The auxiliary pump circulates hydraulic fluid from the hydraulic motor case drain, the fluid passing down a hole in the impeller shaft to a point past the dynamic face seals (which are carbon or graphite), and back. From the circulating hydraulic oil loop created by the auxiliary pump, the hydraulic oil passes adjacent to one of the dynamic seals on its way back to the drive motor's reservoir. The circulation removes any excessive heat from the vicinity of the dynamic seals which block fuel or hydraulic fluid from passing along the clearances between the stationary pump housing and the rotating impeller-inducer-shaft assembly.

In addition, anticipating the possibility that the dynamic seals could leak fuel, the small chamber into which such a leak would flow is connected to a tube running overboard (outside the vessel at least and preferably outside the aircraft) through a passage too small and too long to allow a flame front to propagate from end to end. Thus every conceivable ignition source is covered.

DETAILED DESCRIPTION

Figure 1:
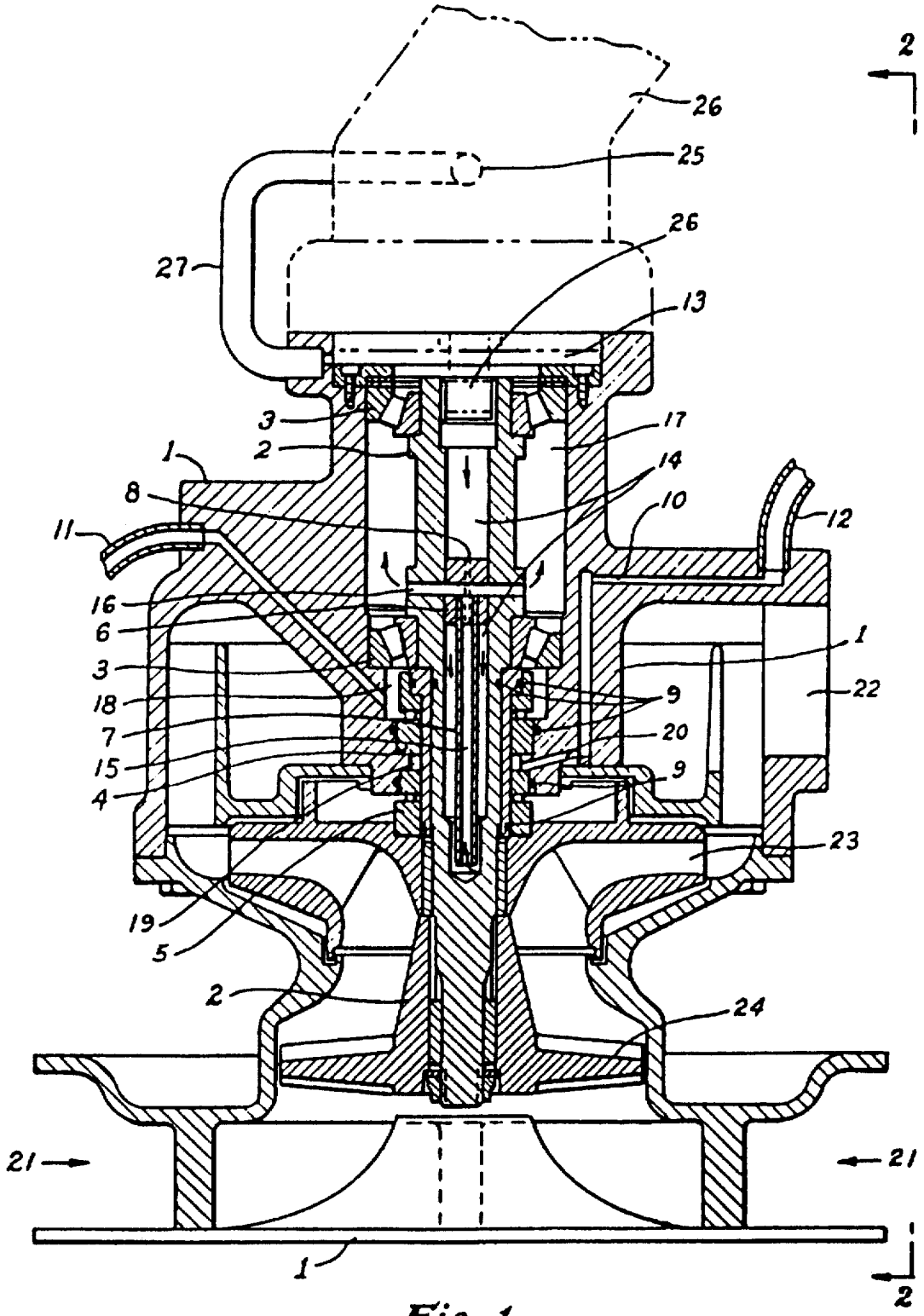
FIG. 1 is a cross sectional view of the entire centrifugal pump.
Figure 2:
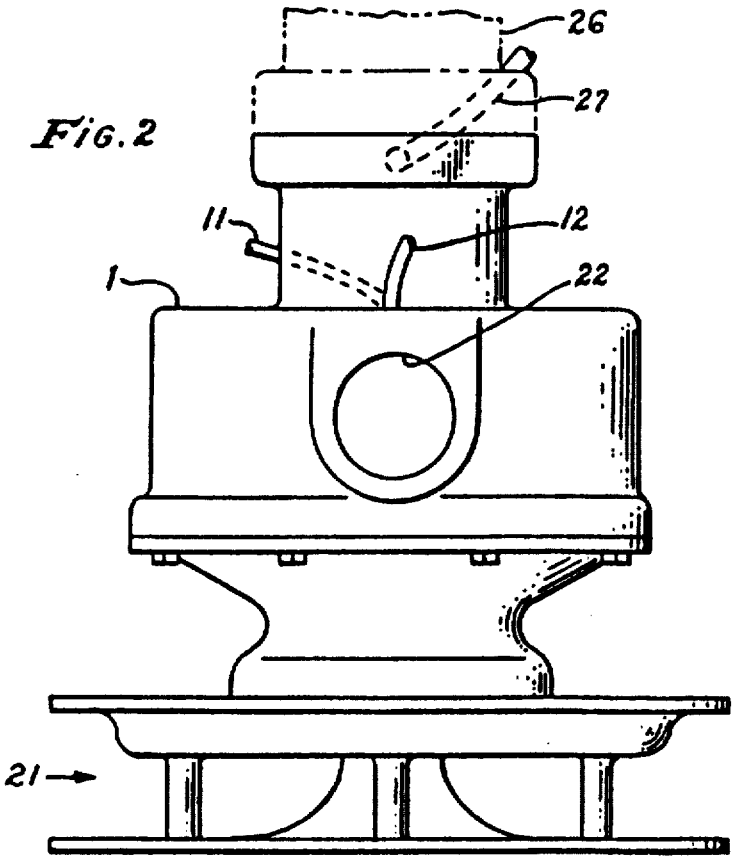
FIG. 2 is an elevation of the entire centrifugal pump taken at right angles to FIG. 1.
Figure 4:
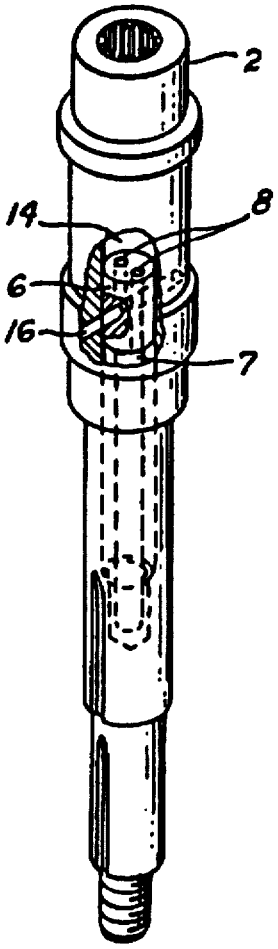
FIG. 4 is a perspective view of the impeller shaft (absent the parts which pump the fuel), and cut away to show detail of the auxiliary pump.

The entire preferred embodiment is shown in cross section in FIG. 1. Many elements and their physical construction are conventional, so are not elaborated on, nor are details as to how parts are fabricated and assembled since any number of ways are commonplace in the art.

Item 1 is the centrifugal pump housing inside which spins Item 2 the impeller shaft, driven by hydraulic motor 26. FIG. 1 shows the shaft of hydraulic motor 26 engaging an internal spline at the top end of impeller shaft 2. In the preferred embodiment two of the spline teeth are removed to open up the passage for hydraulic oil from fluid source cavity 13 to cavity 14. Hydraulic oil flows as shown in FIG. 1, from case drain port Item 25 through drain tube Item 27 to fluid source cavity 13, down impeller shaft 2 through cavity 14 all the way to the bottom of the drilled center hole, back up cavity 15 in the center of tube 7 and is driven by centrifugal force out crosshole 16. Together tube 7 and crosshole 16 form an auxiliary pump producing a small amount of pressure and flow. The pressure forces hydraulic fluid through discharge cavity 17 to both bearings Item 3. In the preferred embodiment these are tapered roller bearings without seals, so through the upper bearing 3 the hydraulic oil flows back to cavity 13 and through the lower bearing 3 it contacts dynamic oil seal 4 in cavity 18 before proceeding through a drilled hole to return tube Item 11 which is connected to the hydraulic oil low pressure reservoir.

Dynamic fuel seal 5 has as its heat rejection means the hydraulic oil flow through the lower extremity of cavity 14. During normal centrifugal pump operation seal 5 is fuel cooled. Both seal 4 and 5 are preferably installed with the graphite part at the top so the body and spring will always be full of fluid. In principle and in keeping with experience dynamic seals 4 and 5 are considered to be capable of slight leakage, whereas all the static seals Item 9 are considered leaktight.

In the preferred embodiment cavity 19 can capture leakage from both dynamic seals, though it would be unusual for air to be present also so as to make a combustible mixture. Still my invention incorporates drilled holes Item 20 to lead whatever leakage occurs through flameproof passage Item 10 to the discharge tube Item 12, which conveys the leaking fluid outside the vessel, preferably outside the aircraft as well. It is a known fact (reported in the CRC Aviation Handbook) that a passage one-sixteenth of an inch diameter will quench a flame front within one-half inch, and in the preferred embodiment flameproof passage Item 10 is more than two inches long. Since the outlet for leakage is well above the inlet, it is to be expected that the cavity 19 and passage 10 will always be full of liquid.

Figure 3:
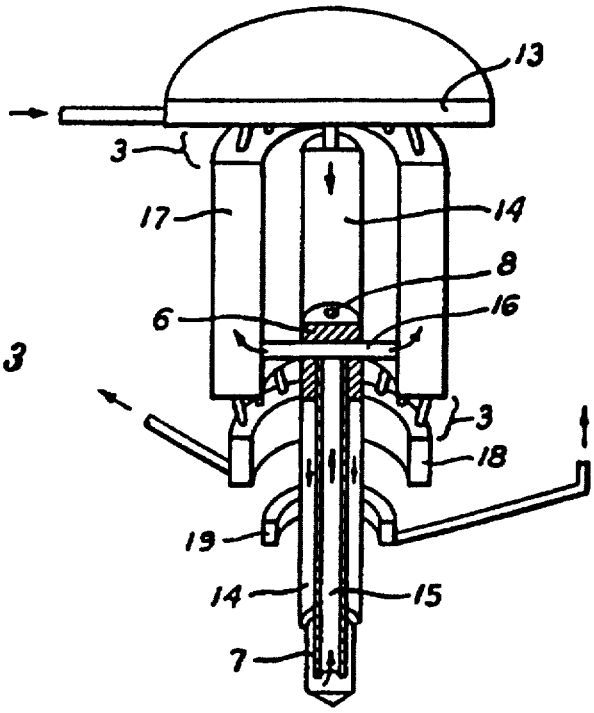
FIG. 3 is a perspective half-section view of the hydraulic oil cavities and passages, standing alone (without walls being shown) except showing the tube and plug comprising the auxiliary pump.

The auxiliary pump which circulates the hydraulic motor's case drain leakage oil (or hydraulic oil from another pressurized source) consists of tube 7 on the impeller axis connecting with crosshole Item 16 at right angles to the axis, both being incorporated in plug Item 6. Item 6 also has throughholes (also called suction holes) Item 8 to transport oil from the upper part of cavity 14 to the lower part, as best seen in FIG. 3 which shows the oil and its circulation path.

Items 21 and 22 are the inlet and outlet parts of the pump. Item 24 is the inducer and Item 23 the curved vanes (the impeller proper) which add energy to the fuel being pumped. These parts are conventional in the sense they have nothing to do with the inventive concept or inventive elements, merely describing the setting for completeness.

The essence of the inventive structure is that, as leakage hydraulic oil returning from the drive motor case to its normal reservoir passes through the attached centrifugal pump, it is driven around a circulation path by the auxiliary pump. This circulation loop is adjacent to, but independent of, the direct leakage hydraulic oil flow path. It picks up hydraulic oil at cavity 13, which may be thought of as a fluid source cavity for the auxiliary pump and, following the arrows in FIG. 3, discharges into discharge cavity 17. Since discharge cavity 17 is in the direct leakage hydraulic oil flow path, communicating as it does with the fluid source cavity 13 through the upper angular contact bearing 3, the flow through the upper bearing is the algebraic sum of leakage flow and auxiliary pumped flow, and the flow through the lower bearing is always equal to leakage flow. Thus, if auxiliary pump flow is larger, flow through the upper angular contact bearing 3 will be upward and flow through the lower bearing 3 downward in FIGS. 1 and 3. Discharge cavity 17 thus feeds cavities 13, 14 upper, 14 lower, 15, and finally itself in the preferred embodiment (Refer to FIG. 3). Pressures within the circuit are those required to adjust the flow given the characteristics of the auxiliary pump. Any deficit of pressure will reduce the circulation flow; any excess of pressure will result in harmless turbulence in cavity 17, but some flow is certain to occur.

The upper part, the angled part, of the usual hydraulic motor being where is pistons are, and the lower part of the case housing its swash plate and output shaft, it would be possible for one skilled in the art to eliminate drain tube 27, plug case drain 25, and, by removing a lip seal or drilling a hole, connect the lower hydraulic motor case to fluid source cavity 13. Or to extend transverse crosshole 16 into discharge cavity 17 using tubes, to cause the auxiliary pump to increase its circulation. These and other modifications to the preferred embodiment being within the capability of those skilled in the art without exercise of the inventive faculty, the scope of the invention is defined by the scope of the following claims:

I claim:

1. A centrifugal pump of the type immersed in a vessel of liquid fuel to empty the vessel and driven by a positive displacement hydraulic motor, the pump being in an ignitable atmosphere and having an impeller shaft, an impeller, and impeller-to-housing dynamic seals as well as the hydraulic motor, in which the improvement comprises:

mounting the impeller shaft on angular contact bearings spring preloaded against each other to avoid runout of the impeller which could create friction heat between the impeller and its housing should the pump run dry, and directing hydraulic oil from the case of the hydraulic motor to an auxiliary pump built into the centrifugal pump shaft, said auxiliary pump forcing circulation of draining hydraulic fluid down a blind hole in the impeller shaft and back, adjacent to the impeller-to-housing dynamic seals and through said angular contact bearings, before returning the hydraulic fluid to its reservoir in order to prevent the impeller-to-housing dynamic seals overheating, and draining any leakage through the impeller-shaft-to-housing seals to atmosphere outside the vessel through a passage in the centrifugal pump case too long for its diameter to allow a flame front to progress from end to end, whereby all potential ignition sources due to running the pump dry in an ignitable atmosphere have been supplied with means to reject heat harmlessly should the centrifugal pump be run dry indefinitely.

2. A centrifugal pump as in claim 1 in which said blind hole in said impeller shaft passes the portion of the impeller shaft opposite the impeller-to-shaft dynamic seals.

3. A centrifugal pump as in claim 1 in which the means for spring loading said angular contact bearings is a wave washer.

4. A centrifugal pump as in claim 1 in which said angular contact bearings are tapered roller bearings.

5. A centrifugal pump as in claim 1 in which said auxiliary pump comprises:

a plug filling the hole in a hollow portion of the impeller shaft, remote from either end of the hollow portion, and a crosshole through impeller shaft and plug communicating at the shaft axis with a tube extending from the crosshole to just short of the blind end of the hollow portion of the impeller shaft, suction holes extending axially through the plug, not communicating with the crosshole, whereby hydraulic fluid will pass through said suction holes, down the tube exterior to its end, back up the tube interior, and be flung out to the exterior of the impeller shaft through the crosshole when the impeller shaft is rotating.

6. A centrifugal pump as in claim 5 in which said crosshole is located between said angular contact bearings and the hydraulic motor case drain is connected to the centrifugal pump housing such that it connects directly both to one angular contact bearing and to the hollow end of said impeller shaft.

7. A circulating pump located in the shaft of a centrifugal fuel transfer pump and used to circulate oil for cooling and lubrication of the centrifugal pump, the circulating pump being internal passages within the shaft, an upright portion communicating with a crosshole, comprising:

a T shaped duct inside the shaft of the centrifugal pump, located symmetrically on the shaft axis, the ends of the crosshole communicating with a discharge cavity for coolant and lubrication fluid and the end of the upright portion communicating with a coolant and lubrication fluid source cavity, thus compelling circulation from the fluid source cavity to the discharge cavity.

*8. A centrifugal pump of the type immersed in a vessel of liquid fuel to empty the vessel and driven by a positive displacement hydraulic motor, the pump being in an ignitable atmosphere and having an impeller shaft, an impeller, and impeller-to-housing dynamic seals as well as the hydraulic motor, in which the improvement comprises:*

*mounting the impeller shaft on bearings preloaded to avoid runout of the impeller which could create friction heat between the impeller and its housing should the pump run dry; and*

*directing hydraulic oil from the case of the hydraulic motor to an auxiliary pump built into the centrifugal pump shaft, said auxiliary pump circulating the hydraulic oil adjacent to the impeller-to-housing dynamic seals and through said bearings, before returning the hydraulic oil to its reservoir in order to prevent the impeller-to-housing dynamic seals overheating.*

*9. The centrifugal pump of claim 8, further including draining any leakage through the impeller-shaft-to-housing seals to atmosphere outside the vessel through a passage in the centrifugal pump case too long for its diameter to allow a flame front to progress from end to end;*

*whereby all potential ignition sources due to running the pump dry in an ignitable atmosphere have been supplied with means to reject heat harmlessly should the centrifugal pump be run dry indefinitely.*

*10. The centrifugal pump of claim 8 wherein said auxiliary pump circulates the hydraulic oil down a blind hole formed in the impeller shaft and back.*

*11. The centrifugal pump as in claim 10 in which said blind hole in said impeller shaft passes the portion of the impeller shaft opposite the impeller-to-shaft dynamic seals.*

*12. The centrifugal pump as in claim 8 in which the means for preloading said bearings is a wave washer.*

*13. The centrifugal pump as in claim 8 in which said bearings are tapered roller bearings.*

*14. The centrifugal pump as in claim 10 in which said auxiliary pump comprises:*

*a plug filling the hole in a hollow portion of the impeller shaft, remote from either end of the hollow portion;*

*a crosshole through impeller shaft and plug communicating at the shaft axis with a tube extending from the crosshole to just short of the blind end of the hollow portion of the impeller shaft; and*

*suction holes extending axially through the plug, not communicating with the crosshole, whereby hydraulic fluid will pass through said suction holes, down the tube exterior to its end, back up the tube interior, and be flung out to the exterior of the impeller shaft through the crosshole when the impeller shaft is rotating.*

*15. The centrifugal pump as in claim 14 in which said crosshole is located between said bearings and the hydraulic motor case drain is connected to the centrifugal pump housing such that it connects directly both to one bearing and to the hollow end of said impeller shaft.*

*16. A pump for immersion within a vessel of liquid fuel to empty the vessel, said pump being adapted to be driven by an hydraulic motor having a case drain for collecting and recirculating hydraulic oil, said pump comprising:*

*a pump housing defining a pump flow path extending between a fluid inlet and a fluid outlet;*

*an impeller within said pump housing for pumping fluid from said inlet to said outlet;*

*a driven shaft carrying said impeller and adapted to be rotatably driven by an hydraulic motor;*

*bearing means for rotatably supporting said drive shaft within said pump housing;*

*seal means coacting between said drive shaft and pump housing to prevent fluid leakage between said bearing means and said pump flow path; and*

*circulating means for circulating hydraulic oil from the hydraulic motor case drain to said bearing means and adjacent said seal means to prevent overheating thereof.*

*17. The pump of claim 16 wherein said impeller is a centrifugal impeller.*

*18. The pump of claim 16 wherein said bearing means comprise angular contact bearings spring-loaded against each other.*

*19. The pump of claim 18 wherein said angular contact bearings are tapered roller bearings.*

*20. The pump of claim 16 wherein said seal means comprise a dynamic seal coacting between said drive shaft and said pump housing.*

*21. The pump of claim 20 further including means defining a leakage path for draining any leakage past said dynamic seal to atmosphere, said leakage path having a cross sectional size and length to prevent sustainment of a flame front therein.*

*22. The pump of claim 16 wherein said circulation means includes an auxiliary pump built into said drive shaft.*

*23. A pump system, comprising:*

*an hydraulic drive motor having means for rotatably driving a drive shaft, said hydraulic motor further including a case drain for collecting and recirculating hydraulic oil; and*

*an impeller unit including a pump housing defining a pump flow path extending between a fluid inlet and a fluid outlet, a drive shaft mounted within said pump housing and carrying an impeller for pumping fluid from said inlet to said outlet, said drive shaft being rotatably supported within said pump housing by bearing means and rotatably driven by said drive shaft, seal means coacting between said drive shaft and said bearing means to prevent fluid leakage between said bearing means and said pump flow path, and circulation means for circulating hydraulic oil from the case drain to said bearing means adjacent said seal means to prevent overheating thereof.*

*24. The pump system of claim 23 wherein said seal means comprise a dynamic seal coacting between said drive shaft and said pump housing.*

*25. The pump system of claim 24 further including means defining a leakage path for draining any leakage past said dynamic seal to atmosphere, said leakage path having a*

*cross sectional size and length to prevent sustainment of a flame front therein.*

*26. The pump system of claim 23 wherein said circulation means includes an auxiliary pump built into said drive shaft.*

* * * * *